(12) United States Patent
Shiimori

(10) Patent No.: US 7,877,684 B2
(45) Date of Patent: Jan. 25, 2011

(54) CALENDAR PRODUCTION APPARATUS

(75) Inventor: Yoshiko Shiimori, Asaka (JP)

(73) Assignee: Fujifilm Corporation, Tokyo (JP)

( * ) Notice: Subject to any disclaimer, the term of this patent is extended or adjusted under 35 U.S.C. 154(b) by 827 days.

(21) Appl. No.: 11/892,114

(22) Filed: Aug. 20, 2007

(65) Prior Publication Data

US 2008/0046815 A1 Feb. 21, 2008

(30) Foreign Application Priority Data

Aug. 21, 2006 (JP) .............................. 2006-224267

(51) Int. Cl.
*G06F 17/00* (2006.01)
(52) U.S. Cl. ..................................... 715/255
(58) Field of Classification Search .................. 715/255
See application file for complete search history.

(56) References Cited

U.S. PATENT DOCUMENTS

| | | | | |
|---|---|---|---|---|
| 5,767,947 A | * | 6/1998 | Schindler et al. | 355/40 |
| 6,081,251 A | * | 6/2000 | Sakai et al. | 345/670 |
| 6,741,278 B1 | * | 5/2004 | Toyofuku et al. | 348/222.1 |
| 7,636,733 B1 | * | 12/2009 | Rothmuller | 1/1 |
| 7,765,461 B2 | * | 7/2010 | Suzuki et al. | 715/200 |
| 2001/0029500 A1 | | 10/2001 | Tanaka | |
| 2002/0147661 A1 | * | 10/2002 | Hatakama et al. | 705/26 |
| 2003/0122839 A1 | * | 7/2003 | Matraszek et al. | 345/581 |
| 2003/0182210 A1 | * | 9/2003 | Weitzman et al. | 705/27 |
| 2004/0125150 A1 | * | 7/2004 | Adcock et al. | 345/810 |
| 2005/0210411 A1 | * | 9/2005 | Morita | 715/825 |
| 2006/0220983 A1 | * | 10/2006 | Isomura et al. | 345/1.1 |
| 2006/0259477 A1 | * | 11/2006 | Morita | 707/3 |
| 2008/0012954 A1 | * | 1/2008 | Sasaki et al. | 348/222.1 |

FOREIGN PATENT DOCUMENTS

JP 2001-273427 A 10/2001

* cited by examiner

*Primary Examiner*—Doug Hutton
*Assistant Examiner*—Andrew R Dyer
(74) *Attorney, Agent, or Firm*—Birch, Stewart, Kolasch & Birch, LLP

(57) ABSTRACT

The present invention is directed to an apparatus and method for producing a calendar. A report, which includes an image and is contributed by a contributor, is recorded and distributed. The invention counts the number of viewings of the image in the report by a viewer, and acquires information on a photographing density. This photographing density expresses the number of images photographed or contributed in a predetermined period before and after a time and date when the image in the report was photographed or contributed. The invention extracts an image for a calendar on the basis of the number of viewings and the photographing density from among the images contributed or photographed in a predetermined month. When a calendar production instruction is received, the invention produces a calendar for the predetermined month when the image was contributed or photographed using the extracted image.

6 Claims, 9 Drawing Sheets

LAYOUT RESULT OF EXTRACTED IMAGES IN JULY

EXTRACTED IMAGES AND POINTS IN JULY

LAYOUT RESULT OF EXTRACTED IMAGES IN AUGUST

EXTRACTED IMAGES AND POINTS IN AUGUST

CALENDAR PRODUCTION APPARATUS

BACKGROUND OF THE INVENTION

1. Field of the Invention

The present invention relates to a calendar production apparatus, and in particular, to service which produces a calendar using an image which is transmitted by a user.

2. Description of the Related Art

Recently, opportunities of photographing images with a camera have been increasing because of spread of electronic cameras and cellular phones. Weblogs (what is called blogs) that exhibit a diary, which contains an image, on a web and social network services (SNS) have been diffused. In addition, services of producing and selling calendars using images photographed using electronic cameras and the like are provided (for example, Japanese Patent Application Laid-Open No. 2001-273427).

Although the service of producing an original calendar using images photographed by oneself is attractive, in the conventional service, there was a problem that an operation for selecting the images used for production of the calendar was complicated. For this reason, in spite of being attractive service, this has not been spread widely.

SUMMARY OF THE INVENTION

The present invention has been made in view of such a situation, and an object of the present invention is to provide a calendar production apparatus which can product a calendar easily using images which a user contributes.

In order to solve the above-mentioned problem, a calendar production apparatus according to a first aspect of the present invention comprises a recording device which records a report which includes an image and is contributed by a contributor; a distribution device which distributes the report, a number-of-viewings count device which counts the number of viewings which is the number of times that an image in the report is viewed by a viewer, an extraction device which extracts an image for a calendar on the basis of the number of viewings from among images contributed or photographed in a predetermined month, a calendar production instruction reception device which receives a calendar production instruction, and a calendar production device which produces a calendar in a month, when an image is contributed or photographed, using the image for a calendar according to the calendar production instruction.

According to the invention relating to the first aspect, it is possible to select images for a calendar automatically on the basis of the number of times by which the distributed images were viewed, and to product the calendar easily. Thereby, it is possible to omit the complicated operation of selection of images for a calendar, and the like, and to promote utilization of the service which produces an original calendar.

The invention according to a second aspect is the calendar production apparatus according to the first aspect, wherein the calendar production device determines a layout of a plurality of images on the basis of the number of viewings of the plurality of images for a calendar when the plurality of images for a calendar are extracted.

According to the invention according to the second aspect, it is possible to select images for a calendar automatically on the basis of information on the number of viewings of the contributed images, to determine the layout, and to product the calendar easily. Thereby, it is possible to omit the complicated operation of selection of images for a calendar, and the like, and to promote utilization of the service which produces an original calendar.

A calendar production apparatus according to a third aspect comprises a recording device which records a report which includes an image and is contributed by a contributor, a photographing density acquisition device which acquires information on a photographing density which expresses the number of images photographed in a predetermined period before and after the time and date when the image in the report was photographed, an extraction device which extracts an image for a calendar on the basis of the photographing density from among images contributed or photographed in a predetermined month, a calendar production instruction reception device which receives a calendar production instruction, and a calendar production device which produces a calendar in a month, when an image is contributed or photographed, using the image for a calendar according to the calendar production instruction.

According to the invention according to the third aspect, it is possible to select images for a calendar automatically on the basis of information on a photographing density which expresses the number of images photographed in a predetermined period before and after the time and date when an image was photographed, and to product a calendar easily. Thereby, it is possible to omit the complicated operation of selection of images for a calendar, and the like, and to promote utilization of the service which produces an original calendar.

The invention according to a fourth aspect is the calendar production apparatus according to the third aspect, wherein the calendar production device determines a layout of a plurality of images on the basis of the photographing density of the plurality of images for a calendar when the plurality of images for a calendar are extracted.

According to the invention according to the fourth aspect, it is possible to select images for a calendar automatically on the basis of information on the photographing density of the contributed images, to determine the layout, and to product the calendar easily. Thereby, it is possible to omit the complicated operation of selection of images for a calendar, and the like, and to promote utilization of the service which produces an original calendar.

A calendar production apparatus according to a fifth aspect comprises a recording device which records a report which includes an image and is contributed by a contributor, a distribution device which distributes the report, a number-of-viewings count device which counts the number of viewings which is the number of times that an image in the report is viewed by a viewer, a photographing density acquisition device which acquires information on a photographing density which expresses the number of images photographed in a predetermined period before and after the time and date when the image in the report was photographed, an extraction device which extracts an image for a calendar on the basis of the number of viewings and the photographing density from among images contributed or photographed in a predetermined month, a calendar production instruction reception device which receives a calendar production instruction, and a calendar production device which produces a calendar in a month, when an image is contributed or photographed, using the image for a calendar according to the calendar production instruction.

According to the invention relating to the fifth aspect, it is possible to select images for a calendar automatically on the basis of information on the numbers of viewings and the photographing density, and to product the calendar easily.

Thereby, it is possible to omit the complicated operation of selection of images for a calendar, and the like, and to promote utilization of the service which produces an original calendar.

The invention according to a sixth aspect is the calendar production apparatus according to the fifth aspect, wherein the calendar production device determines a layout of a plurality of images on the basis of at least either of the number of viewings and the photographing density of the plurality of images for a calendar when the plurality of images for a calendar are extracted.

According to the invention according to the sixth aspect, it is possible to select images for a calendar automatically on the basis of information on the number of viewings or the photographing density of the contributed images, to determine the layout, and to product the calendar easily. Thereby, it is possible to omit the complicated operation of selection of images for a calendar, and the like, and to promote utilization of the service which produces an original calendar.

According to the present invention, it is possible to select images for a calendar automatically on the basis of information on the number of viewings or the photographing density of the contributed images, to determine the layout, and to product the calendar easily. Thereby, it is possible to omit the complicated operation of selection of images for a calendar, and the like, and to promote utilization of the service which produces an original calendar.

DETAILED DESCRIPTION OF THE PREFERRED EMBODIMENTS

Preferable embodiments of a calendar production apparatus according to the present invention will be described below according to accompanying drawings.

First Embodiment

Figure 1:
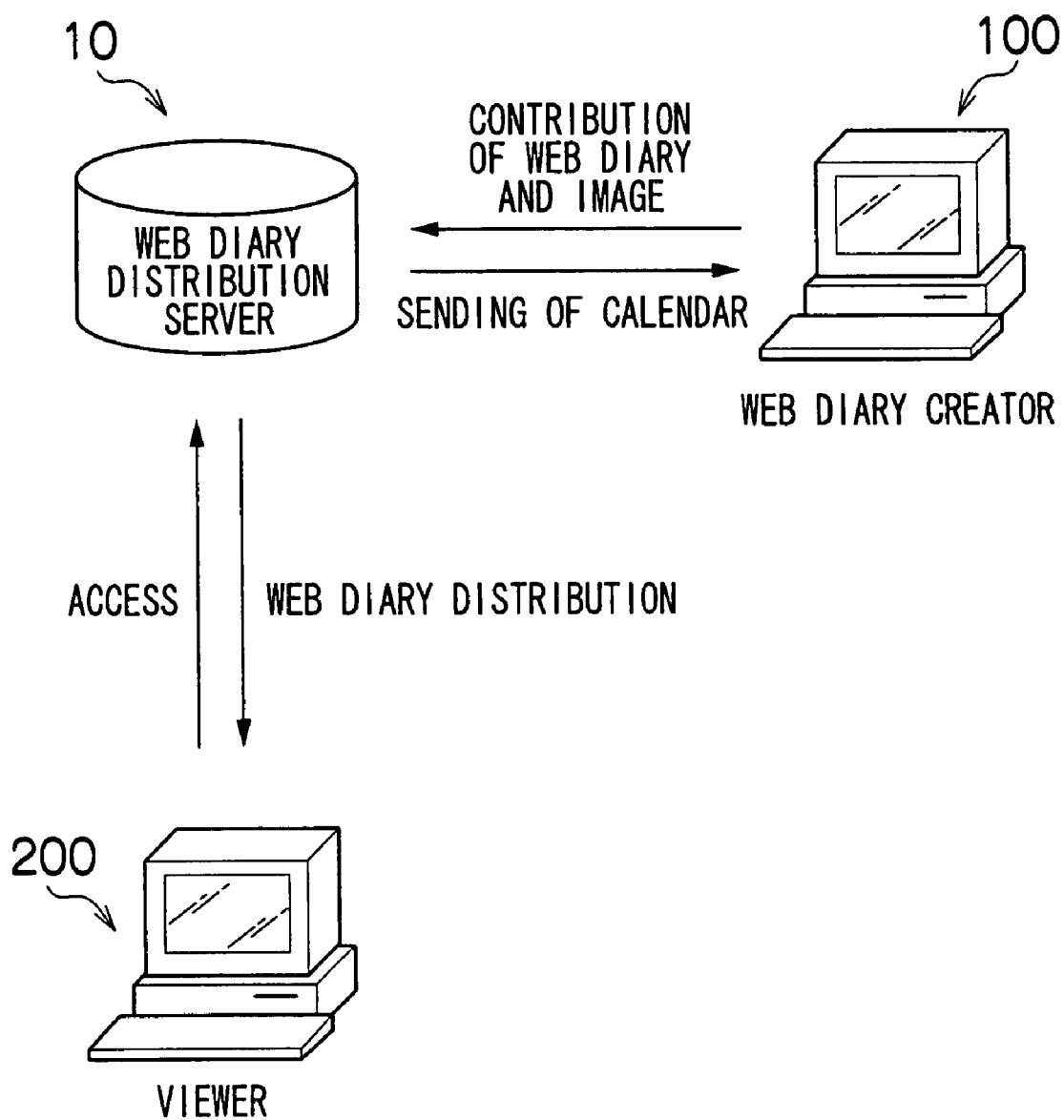
FIG. 1 is a diagram for explaining a web diary distribution server having a calendar production apparatus according to a first embodiment of the present invention.

FIG. 1 is a diagram for describing a web diary distribution server having a calendar production apparatus according to a first embodiment of the present invention. As illustrated in FIG. 1, a web diary producer's terminal 100 can communicate with a web diary distribution server 10 through a network, and it is a terminal which a web diary creator uses for a contribution and viewing of a web diary. The web diary producer's terminal 100 is constructed of a personal computer (PC), and a cellular phone and a personal digital assistant (PDA) which have a communication function, and the like, for example.

A web diary creator produces a web diary using the web diary producer's terminal 100, and contributes the diary to a web diary distribution server in which he/she has an account. The web diary distribution server 10 distributes a web diary to a viewer's terminal in response to a request which requests distribution of the web diary from the viewer's terminal (for example, a personal computer (PC), and a cellular phone and a personal digital assistant (PDA) which have a communication function) which can communicate through a network.

[Construction of Web Diary Producer's Terminal 100]

Figure 2:
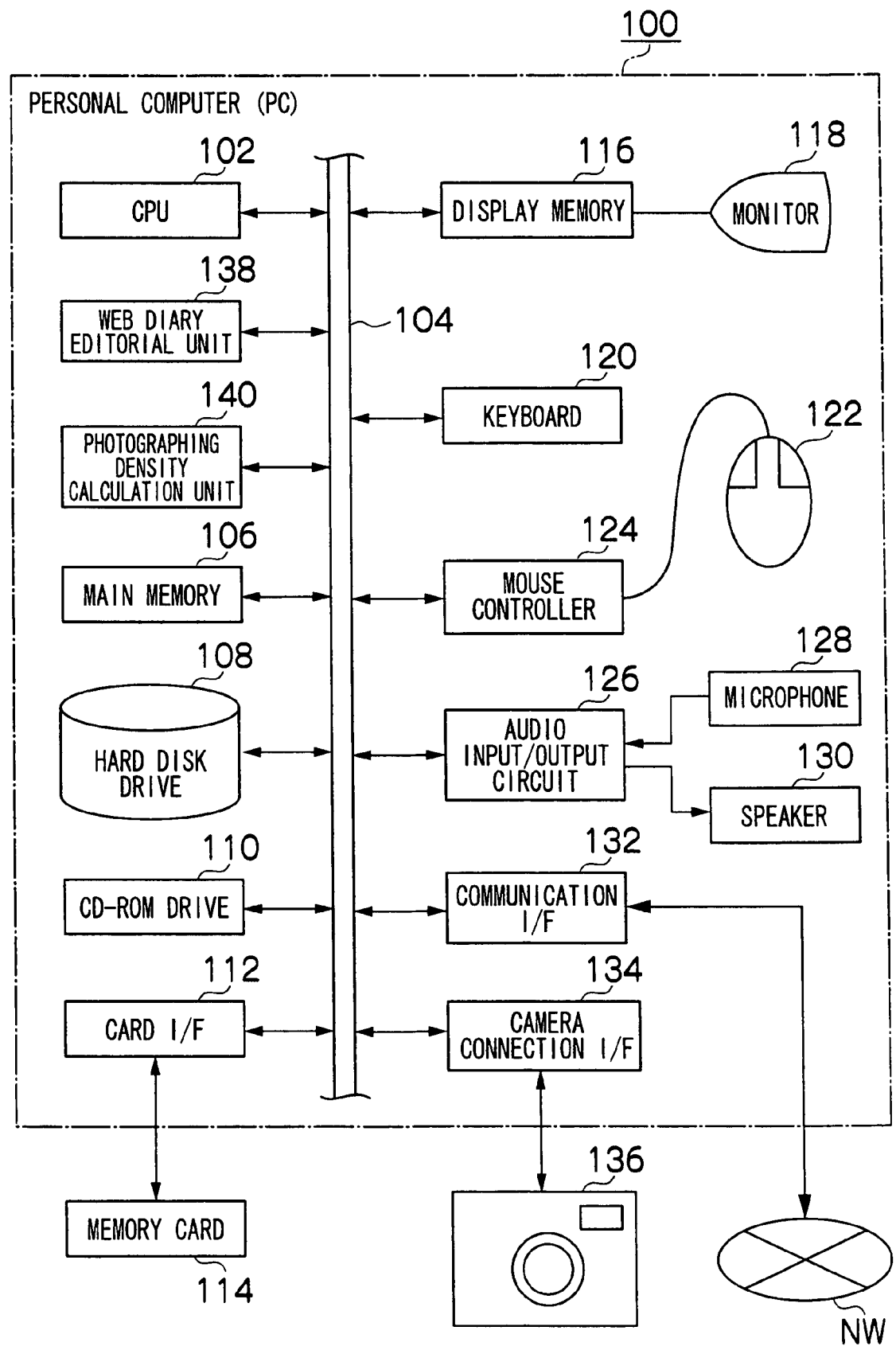
FIG. 2 is a block diagram illustrating main construction of a web diary producer's terminal 100.

FIG. 2 is a block diagram illustrating main construction of the web diary producer's terminal 100. The web diary producer's terminal 100 is constructed of a personal computer (PC) or the like, for example, and is an apparatus for producing a web diary, contributing the diary to a web diary distribution server, and the like. As shown in FIG. 2, a central processing unit (CPU) 102 is connected to respective blocks in the web diary producer's terminal 100 through a bus 104, and controls operations of respective blocks. Main memory 106 includes a storage area where a control program is stored, and a workspace at the time of program execution. A hard disk drive 108 stores an operating system (OS) of the web diary producer's terminal 100, various kinds of application software, and the like. A CD-ROM drive 110 reads data from CD-ROM which is not shown. A card interface unit (card I/F) 112 reads image data in a memory card 114. Display memory 116 temporarily stores data for display. A monitor 118 is constructed of, for example, a CRT (Cathode Ray Tube) monitor or an LCD monitor, and displays an image, a character, and the like on the basis of image data, character data, and the like which are output from this display memory 116. A keyboard 120 and a mouse 122 receives an operation input from an operator and inputs a signal according to an operation input into the CPU 102. In addition, as a pointing device, a touch panel, a touchpad, or the like can be used besides the mouse 122. A mouse controller 124 detects a state of the mouse 122, and outputs signals of such as a position of a mouse pointer on the monitor 118, and a state of the mouse 122 to the CPU 102. An audio input/output circuit 126 to which a microphone 128 and a speaker 130 are connected and various kinds of sound signals are input plays back and outputs various of operation sound according to an operation input from the keyboard 120 or the like. A communication interface unit (communication I/F) 132 communicates with a network NW. A camera connecting interface unit (camera connection I/F) 134 transmits and receives data between with a photographing apparatus (an electronic camera, or a digital camera) 136.

A web diary editorial unit 138 produces a web diary on the basis of an operation input from the keyboard 120 or the mouse 122. An image can be pasted 7 on the web diary.

A photographing density calculation unit 140 acquires an image file recorded on the hard disk drive 108 and information of its photographing time and date, counts the number of images photographed within a predetermined time (for example, 3 hours) before and after the photographing time and date of the image pasted on the web diary, and writes this counted number in the image file, which is pasted on the web diary, as additional information (for example, EXIF tag information).

The web diary producted by the web diary editorial unit 138 is contributed to the web diary distribution server 10 through the network NW.

[Construction of Web Diary Distribution Server 10]

Figure 3:
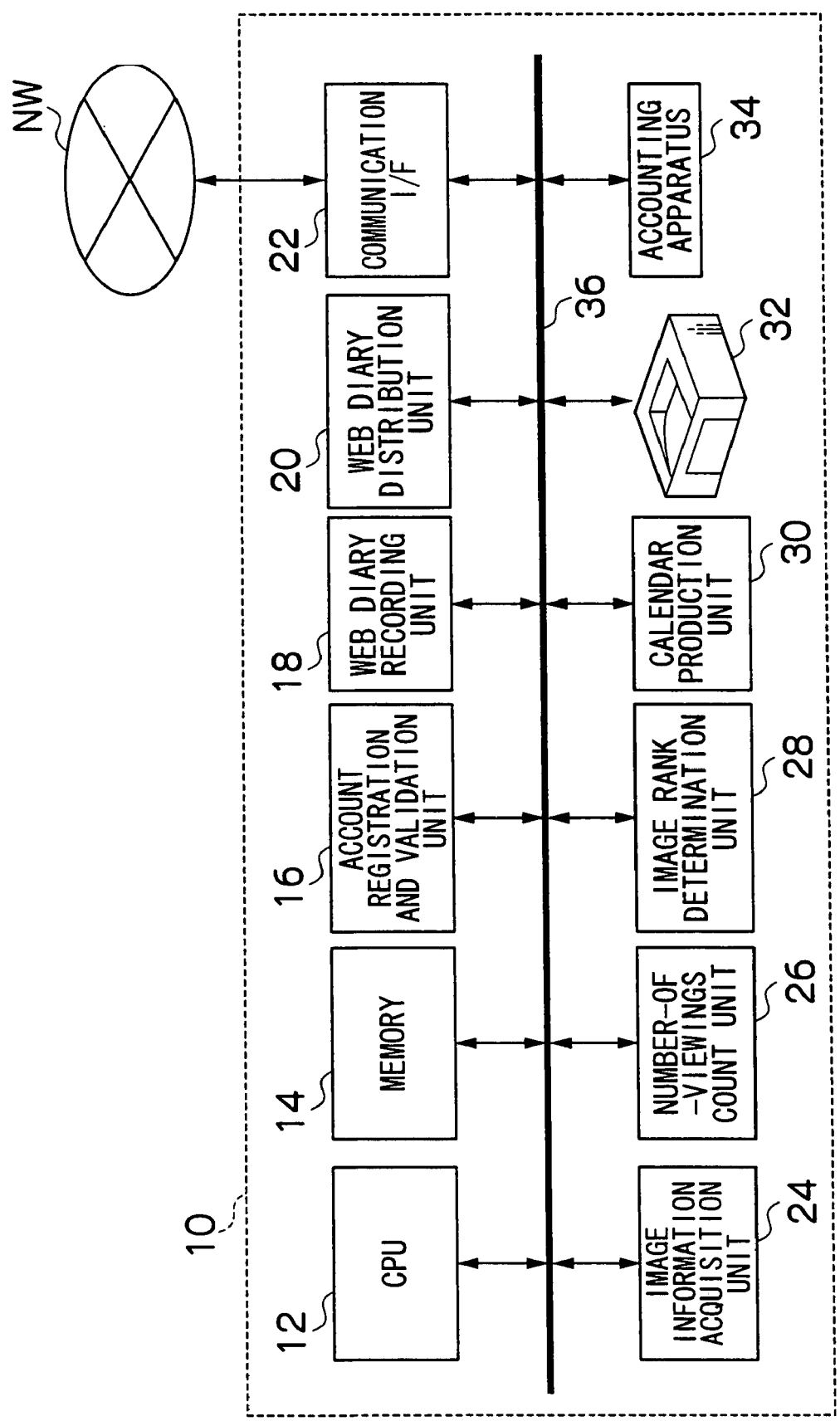
FIG. 3 is a block diagram illustrating main construction of a web diary distribution server 10.

FIG. 3 is a block diagram illustrating main construction of a web diary distribution server 10. As illustrated in FIG. 3, the web diary distribution server 10 includes a CPU 12, memory 14, an account registration and validation unit 16, a web diary recording unit 18, a web diary distribution unit 20, a communication interface unit (communication I/F) 22, an image information acquisition unit 24, a number-of-viewings count unit 26, an image rank determination unit 28, a calendar production unit 30, a printer 32, and a changing apparatus 34.

As illustrated in FIG. 3, the CPU 12 is connected to each unit in the web diary distribution server 10 through the bus 36, and is an integrated control unit which controls operations of the web diary distribution server 10. The memory 14 has ROM in which programs which the CPU 12 processes, various data necessary for control, and the like are stored, and SDRAM used as a working area, where the CPU 12 performs various kinds of operation processings, an image processing area, and the like.

The account registration and validation unit 16 registers a web diary producer's account, and permits a contribution and an edit of a web diary to the web diary producer's terminal 100 by predetermined validation processing when receiving an access from the web diary producer's terminal 100.

The communication interface unit (communication I/F) 22 is connected to the network NW, and transmits and receives various data in conformance with a predetermined protocol.

A web diary contributed from the web diary producer's terminal 100 is input into the web diary recording unit 18 through the communication I/F 22. The web diary recording unit 18 records the web diary contributed from the web diary producer's terminal 100. The web diary distribution unit 20 acquires a web diary from the web diary recording unit 18 according to a request of the web diary from the viewer side terminal 200, and distributes it to the viewer side terminal 200 through the communication I/F 20.

Next, a function of producing a calendar in the web diary distribution server 10 will be described. The image information acquisition unit 24 acquires information on a contributed month and a photographing density from an image contained in a report of a web diary recorded on the web diary recording unit 18.

The number-of-viewings count unit 26 counts the number of viewings which was performed for every image which is contained in a web diary.

The image rank determination unit 28 classifies images in a web diary into every contributed month, and determines a rank for every contributed month of the images in the web diary on the basis of the number of viewings for each image, and a photographing density.

When receiving a calendar production instruction from the web diary producer's terminal 100, the calendar production unit 30 produces a calendar using images whose ranks are the first place respectively in January to December. Then, the calendar production unit 30 converts the producted calendar into data for a print, and outputs it to the printer 32. The printer 32 prints the data of the calendar for a print input from the calendar production unit 30. The printed calendar is delivered to a web diary creator.

The accounting apparatus 34 performs fee collection processing of a price for a calendar to the web diary creator who outputted the calendar production instruction.

[Processing at the Time of Contribution of Web Diary]

Figure 4:
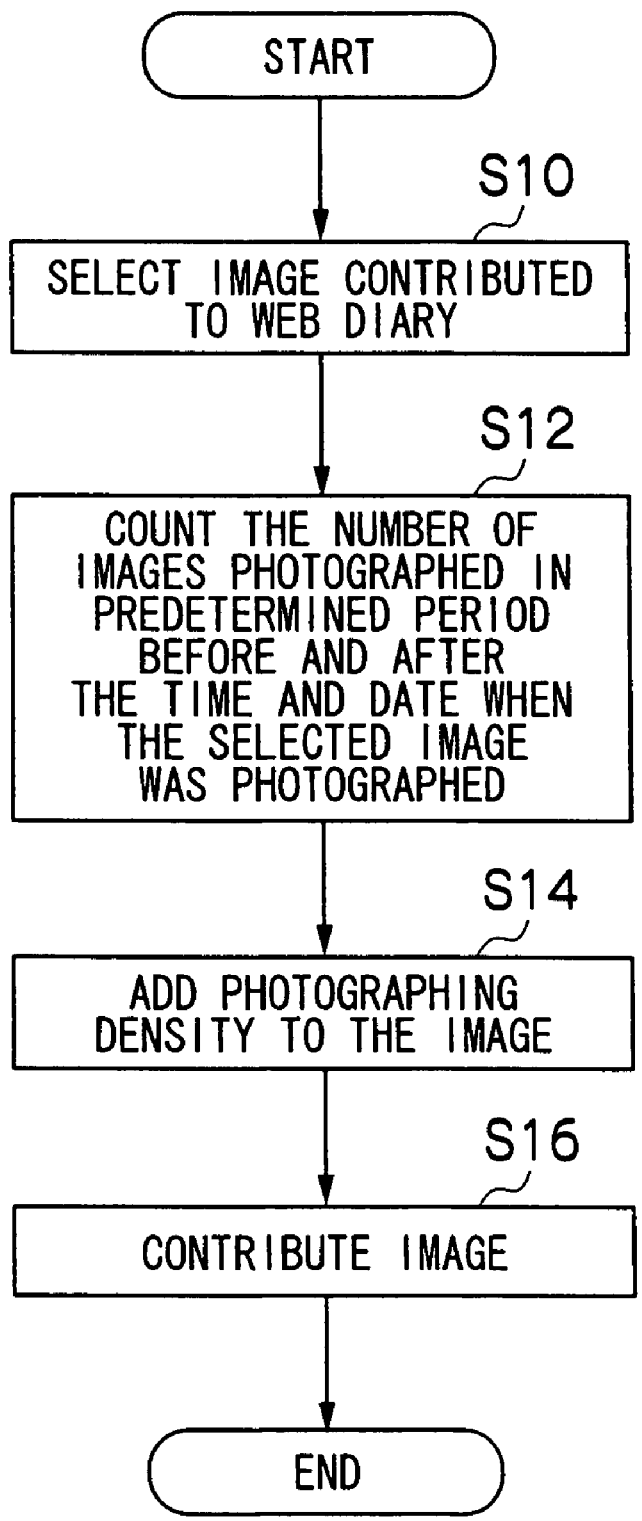
FIG. 4 is a flowchart illustrating processing of contributing a web diary in the web diary producer's terminal 100.

Next, a process flow of contributing a web diary in the web diary producer's terminal 100 will be described with reference to a flowchart of FIG. 4. First, the web diary editorial unit 138 produces a report of a web diary, and as illustrated in FIG. 4, an image which appears in the article concerned and is contributed is selected (Step S10). Next, the photographing density calculation unit 140 of the web diary producer's terminal 100 acquires information on the photographing time and date of an image stored in the hard disk drive 108, and counts the number of images (photographing density) photographed within a predetermined period (for example, 30 minutes or less) before and after the photographing time and date of the image concerned (Step S12). Then, the above-mentioned photographing density is added to the image concerned (Step S14), and the image is contributed to the web diary distribution server 10 with the article of the web diary (Step S16).

[Calendar Production Processing]

Figure 5:
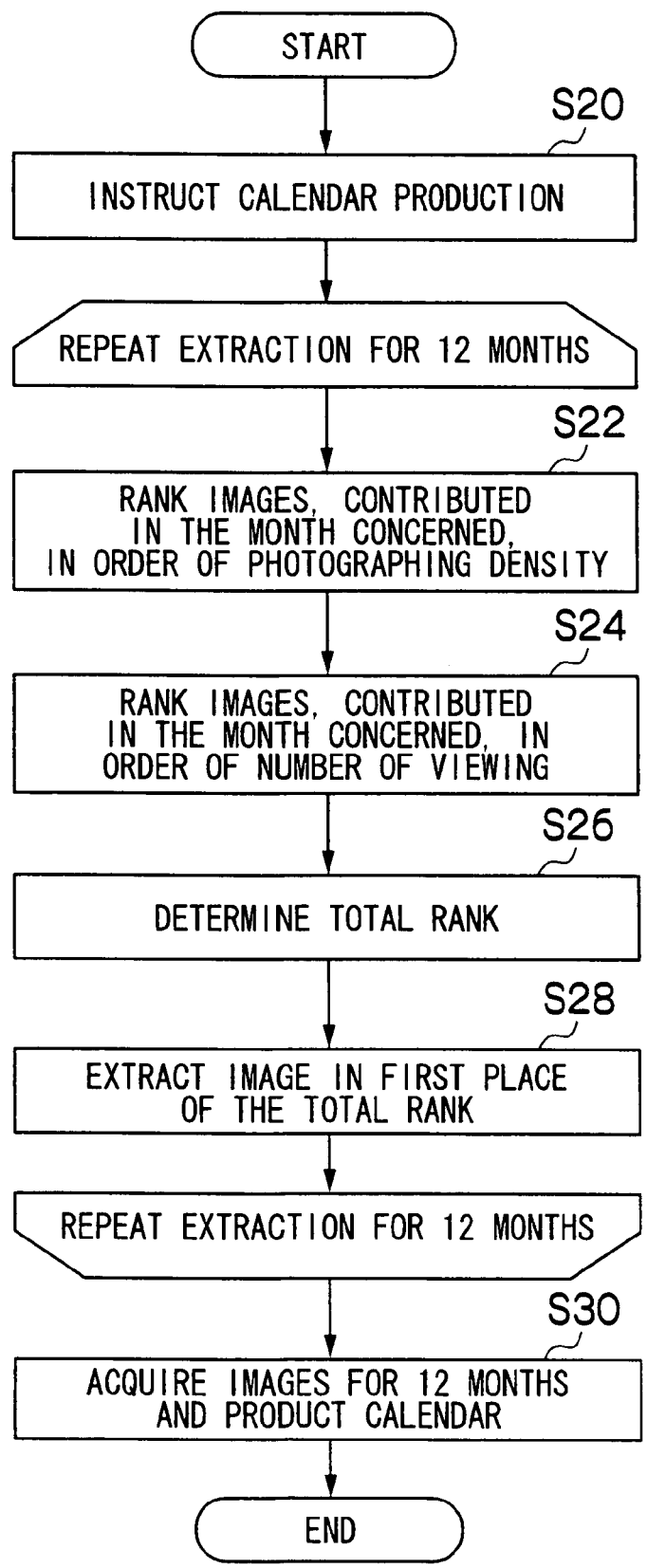
FIG. 5 is a flowchart illustrating processing of producing a calendar in the web diary distribution server 10.

Next, a process flow of producing a web diary in the web diary distribution server 10 will be described with reference to a flowchart of FIG. 5. When receiving a calendar production instruction from the web diary producer's terminal 100 (Step S20), images for a calendar for 12 months to be used for production of the calendar are extracted from among images in the web diary distributed from the web diary distribution server 10 (Steps S22 to S28).

First, the image information acquisition unit 24 acquires information on a photographing density from images contributed in January. Then, the image rank determination unit 28 ranks images, contributed in January, in order of a high photographing density (Step S22).

Next, the image rank determination unit 28 ranks the images, contributed in January, in a descending order of the number of viewings which the number-of-viewings count unit 26 counted (Step S24).

Subsequently, total rank of the images contributed in January is determined on the basis of the rank determined at Steps S22 and S24 (step S26), the image in the first place of the total rank is extracted as an image for a calendar in January (Step S28). At Step S26, the total rank is determined by performing ranking in an ascending order of a value obtained by weighing and adding, for example, the rank based on the photographing density and the rank based on the number of viewings. For example, the total rank is determined in an ascending order of a value obtained by assigning a weight of 70% to the rank based on the photographing density, and a weight of 30% to the rank based on the number of viewings, and adding them, that is, (rank based on photographing density)×70%+(rank based on number of viewings)×30%.

Then, when Steps S22 to S28 are repeated also about images from February to December and images for a calendar in January to December are acquired, calendar data is producted by the calendar production unit 30, and is output and printed in the printer 32. In addition, the predetermined fee collection processing is performed to a web diary creator (Step S30).

According to this embodiment, it is possible to select images for a calendar automatically and to product a calendar easily. Thereby, it is possible to omit the complicated operation of selection of images for a calendar, and the like, and to promote utilization of the service which produces an original calendar.

Second Embodiment

Next, a second embodiment of the present invention will be described. In addition, the construction of the web diary producer's terminal 100 and the processing of contributing a web diary from the web diary producer's terminal 100 are the same as those of the above-mentioned first embodiment.

Figure 6:
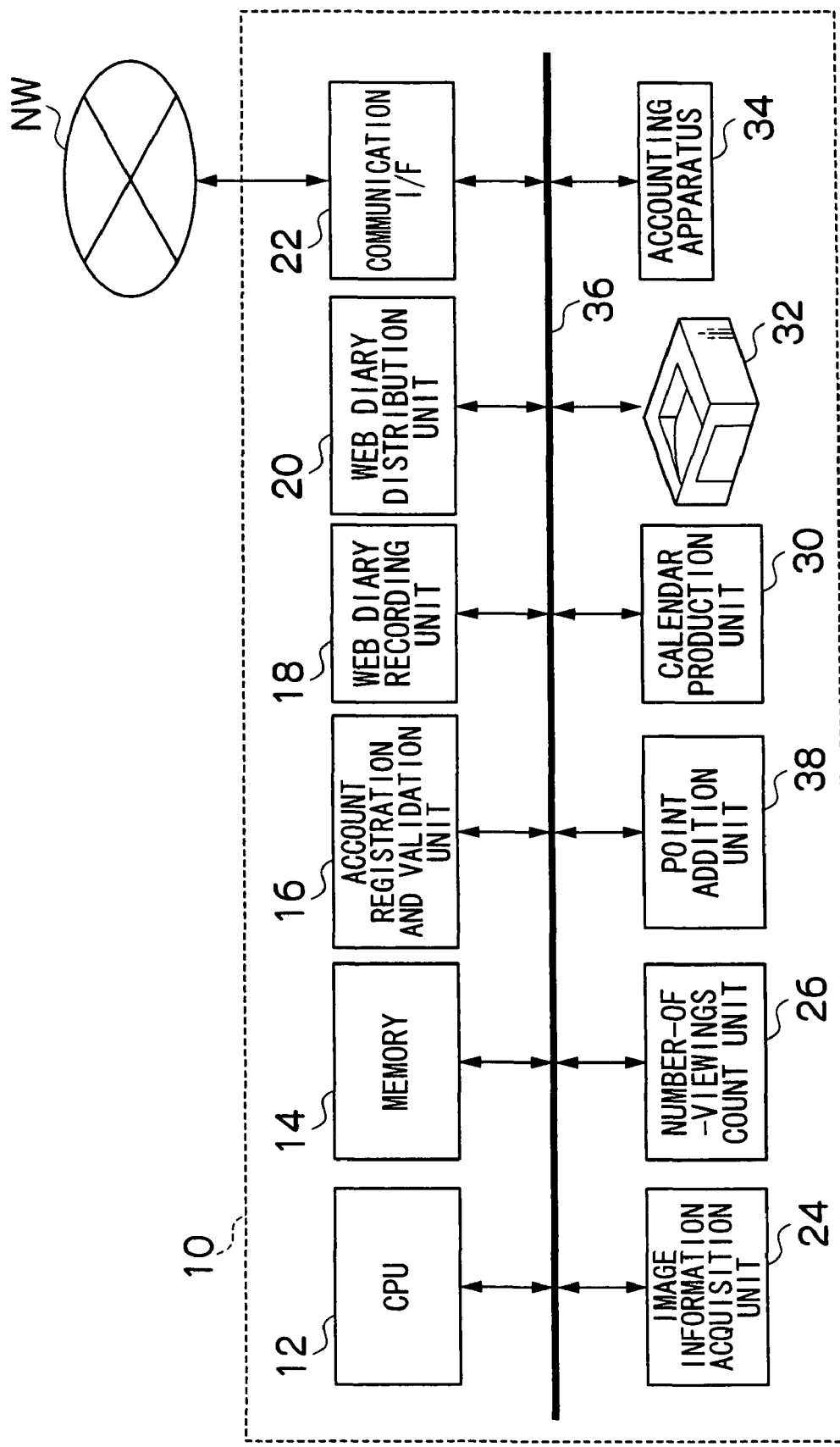
FIG. 6 is a block diagram illustrating main construction of the web diary distribution server having a calendar production apparatus according to a second embodiment of the present invention.

FIG. 6 is a block diagram illustrating main construction of the web diary distribution server 10 having the calendar production apparatus according to the second embodiment of the present invention. As shown in FIG. 6, the web diary distribution server 10 of this embodiment includes the point addition unit 38 which gives a point, used as a standard for selecting an image for a calendar, to an image which appears in a web diary and distributed.

Figure 7:
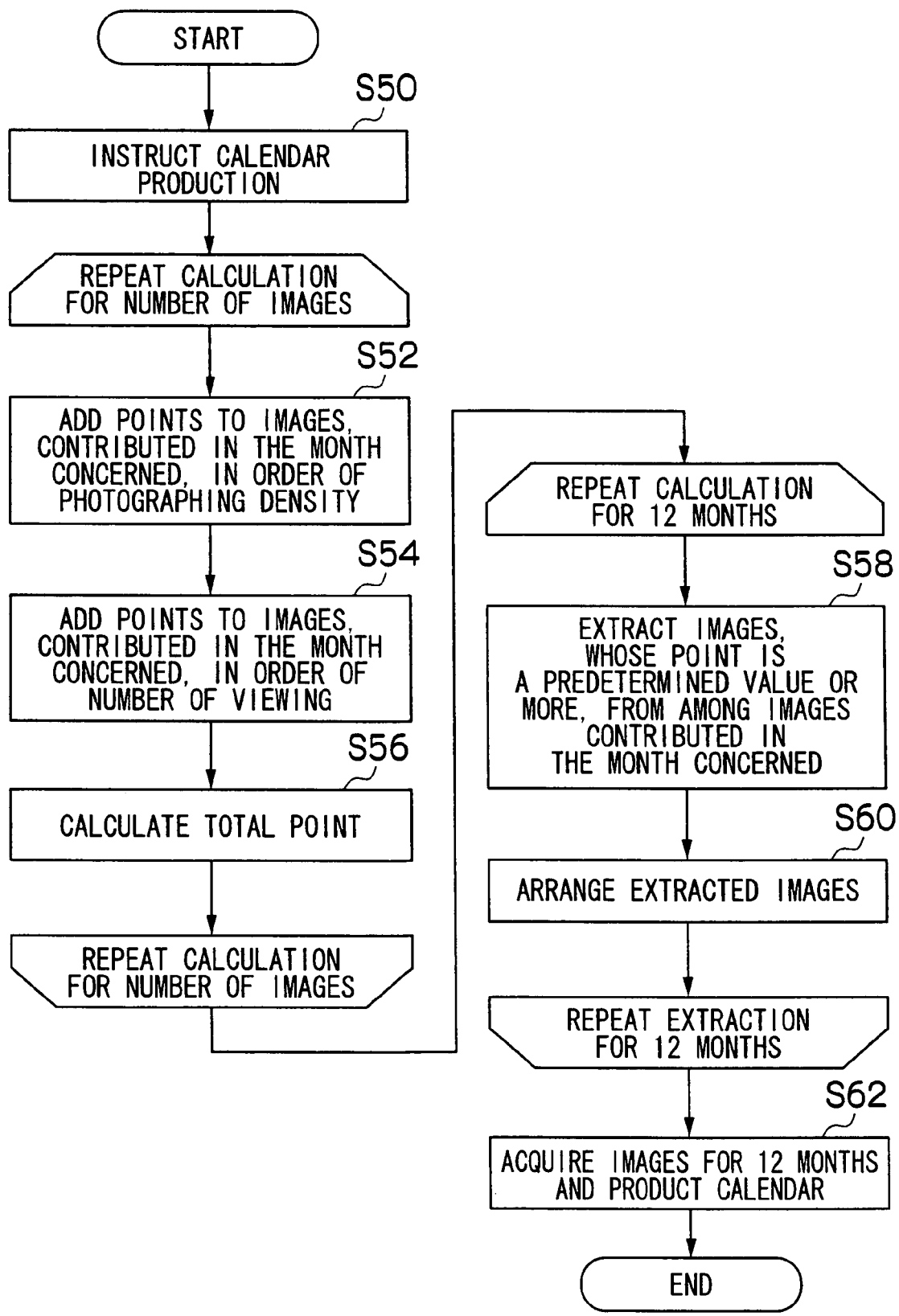
FIG. 7 is a flowchart illustrating processing of producing a calendar in the web diary distribution server 10.

FIG. 7 is a flowchart illustrating processing of producing a calendar in the web diary distribution server 10. When the web diary distribution server 10 receives a calendar production instruction from the web diary producer's terminal 100 (Step S50), a point used as a standard for selecting an image for a calendar is given to an image in a web diary to be distributed from the web diary distribution server 10 (Steps S52 to S56).

First, the image information acquisition unit 24 acquires information on a photographing density from an image in a web diary, and the point addition unit 38 gives a point according to a photographing density (Step S52). Here, the photographing density is a number of images photographed within a predetermined period (for example, less than 30 minutes) before and after the photographing time and date of the image concerned. At Step S52, 0 point is given in the case of zero to nine of photographing density, 1 point is given in the case of ten to 49, and 2 points are given in the case of 50 or more.

Next, the point addition unit 38 gives the point according to the number of viewings which the number-of-viewings count unit 26 counted (step S54). At Step S54, 0 point is given in the case that the number of viewings is zero to nine, 1 point is given in the case of ten to 49, and 2 points are given in the case of 50 or more.

Next, the total point of the image concerned is calculated by the points, given at Steps S52 and S54, being added (step S56). Then, the above-mentioned Steps S52 to S54 are repeated, and the total point is calculated and given about all the images contributed by the web diary creator.

Subsequently, images with the point which are a predetermined value or more (for example, three or more points) are extracted from among the images contributed in January by the calendar production unit 30 (Step S58), and the images for a calendar which are extracted are automatically arranged (Step S60). Then, the Steps S58 and S60 are repeated also about the images from February to December, and extraction and automatic layout of images are performed.

Then, when the images for a calendar in January to December are acquired, calendar data is producted by the calendar production unit 30, and it is output and printed in the printer 32. In addition, the predetermined fee collection processing is performed to a web diary creator (Step S62).

Figure 8B:
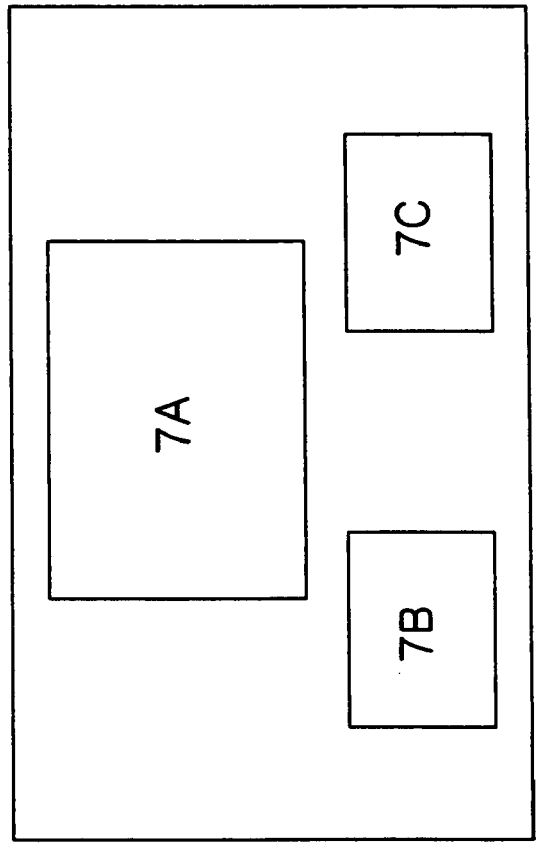
FIGS. 8A and B are drawings illustrating an example of a layout of images for a calendar.
Figure 8A:
Figure 8A:
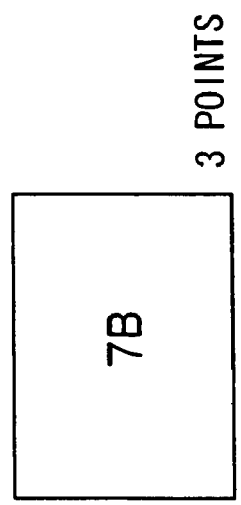
Figure 8A:
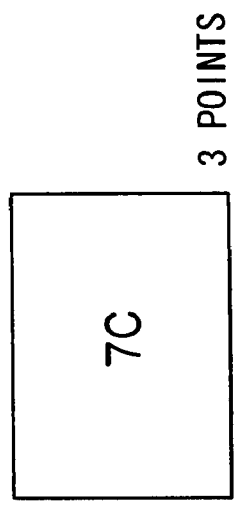
Figure 9B:
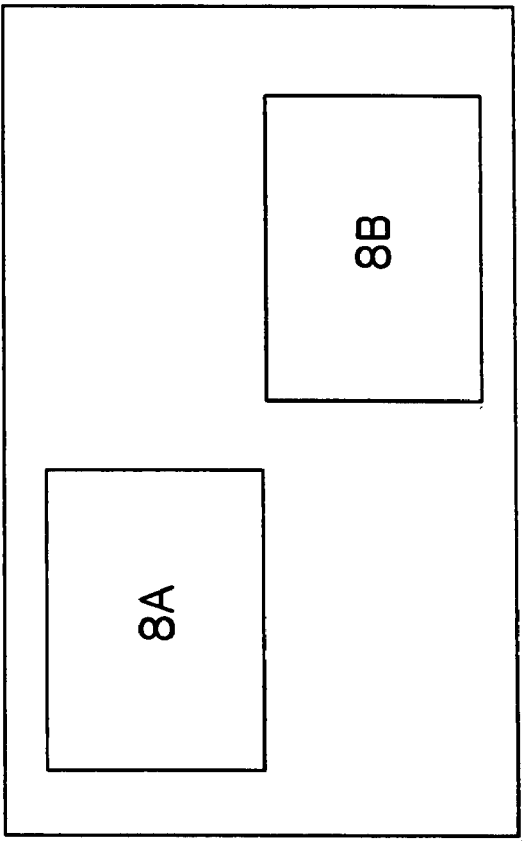
FIGS. 9A and B are drawings illustrating an example of a layout of images for a calendar.
Figure 9A:
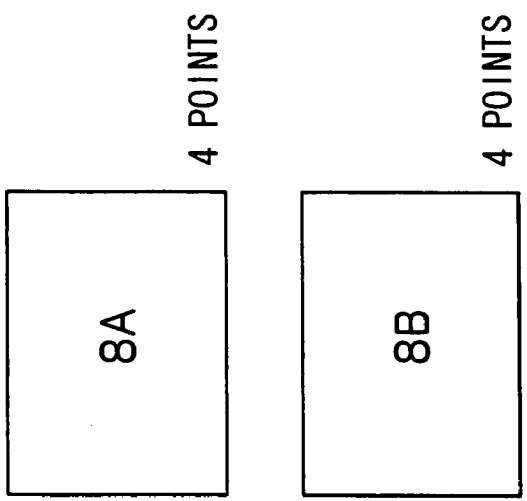

At Step S60, the images for a calendar are arranged according to the number of extracted images and the number of the point. FIGS. 8A, 8B, 9A, and 9B are drawings illustrating examples of layouts of images for a calendar. As shown in FIG. 8A, when one image with four points and two images with three points are extracted from among the images contributed in July, as shown in FIG. 8B, the image 7A with four points is arranged so as to be in size larger than the images 7B and 7C with three points. On the other hand, as shown in FIG. 8A, when two image with four points are extracted from among the images contributed in August, as shown in FIG. 9B, the image 8A and 8B with four points are arranged so as to be in the approximately same size.

According to this embodiment, it is possible to select images for a calendar automatically, to arrange them, and to product a calendar easily.

In addition, although it is made in the above-mentioned embodiment to charge a fee by printing a calendar in the web diary distribution server 10, it is also sufficient that the web diary distribution server 10 just produces calendar data and the web diary producer's terminal 100 may download the calendar data to print the calendar data.

Furthermore, although images for a calendar are extracted for every month in the above-mentioned embodiment, images for a calendar may be extracted according to a kind of calendar, for example, every day in the case of a daily calendar, every week in the case of a weekly calendar, or every several month or half a year in the case of a season calendar.

What is claimed is:

1. A computer-implemented method for producing a calendar, comprising:
    recording a report that includes an image and is contributed by a contributor;
    distributing the report;
    counting the number of viewings of the image in the report by a viewer;
    acquiring information on a photographing density, where the photographing density expresses the number of images photographed or contributed in a predetermined period before and after a time and date when the image in the report was photographed or contributed;
    extracting the image for a calendar on the basis of the number of viewings and the photographing density from among the images contributed or photographed in a predetermined month;
    receiving a calendar production instruction; and
    producing a calendar for the predetermined month when the image was contributed or photographed, using the image for the calendar according to the calendar production instruction.

2. The computer-implemented method according to claim 1, wherein producing the calendar determines a layout of a plurality of images on the basis of either the number of viewings or the photographing density of the plurality of images for the calendar when the plurality of images for the calendar are extracted.

3. A computer readable storage medium, containing instructions for producing a calendar comprising:
    a recording module that records a report that includes an image and is contributed by a contributor;
    a distribution module that distributes the report;
    a number-of-viewings count module that counts the number of viewings of the image in the report by a viewer;
    a photographing density acquisition module that acquires information on a photographing density, where the photographing density expresses the number of images photographed or contributed in a predetermined period before and after a time and date when the image in the report was photographed or contributed;
    an extraction module that extracts the image for a calendar on the basis of the number of viewings and the photographing density from among the images contributed or photographed in a predetermined month;

a calendar production instruction reception module that receives a calendar production instruction; and a calendar production module that produces a calendar for the predetermined month when the image was contributed or photographed, using the image for the calendar according to the calendar production instruction.

4. A calendar production apparatus, comprising:

a recording device that records a report that includes an image and is contributed by a contributor;

a distribution device that distributes the report;

a number-of-viewings count device that counts the number of viewings of the image in the report by a viewer;

a photographing density acquisition device that acquires information on a photographing density, where the photographing density expresses the number of images photographed or contributed in a predetermined period before and after a time and date when the image in the report was photographed or contributed;

an extraction device that extracts the image for a calendar on the basis of the number of viewings and the photographing density from among the images contributed or photographed in a predetermined month;

a calendar production instruction reception device that receives a calendar production instruction; and a calendar production device that produces a calendar for the predetermined month when the image was contributed or photographed, using the image for the calendar according to the calendar production instruction.

5. The computer readable storage medium according to claim 4, wherein the calendar production module determines a layout of a plurality of images on the basis of either the number of viewings or the photographing density of the plurality of images for the calendar when the plurality of images for the calendar are extracted.

6. The calendar production apparatus according to claim 4, wherein the calendar production device determines a layout of a plurality of images on the basis of either the number of viewings or the photographing density of the plurality of images for the calendar when the plurality of images for the calendar are extracted.

* * * * *